United States Patent Office  3,606,312
Patented Sept. 20, 1971

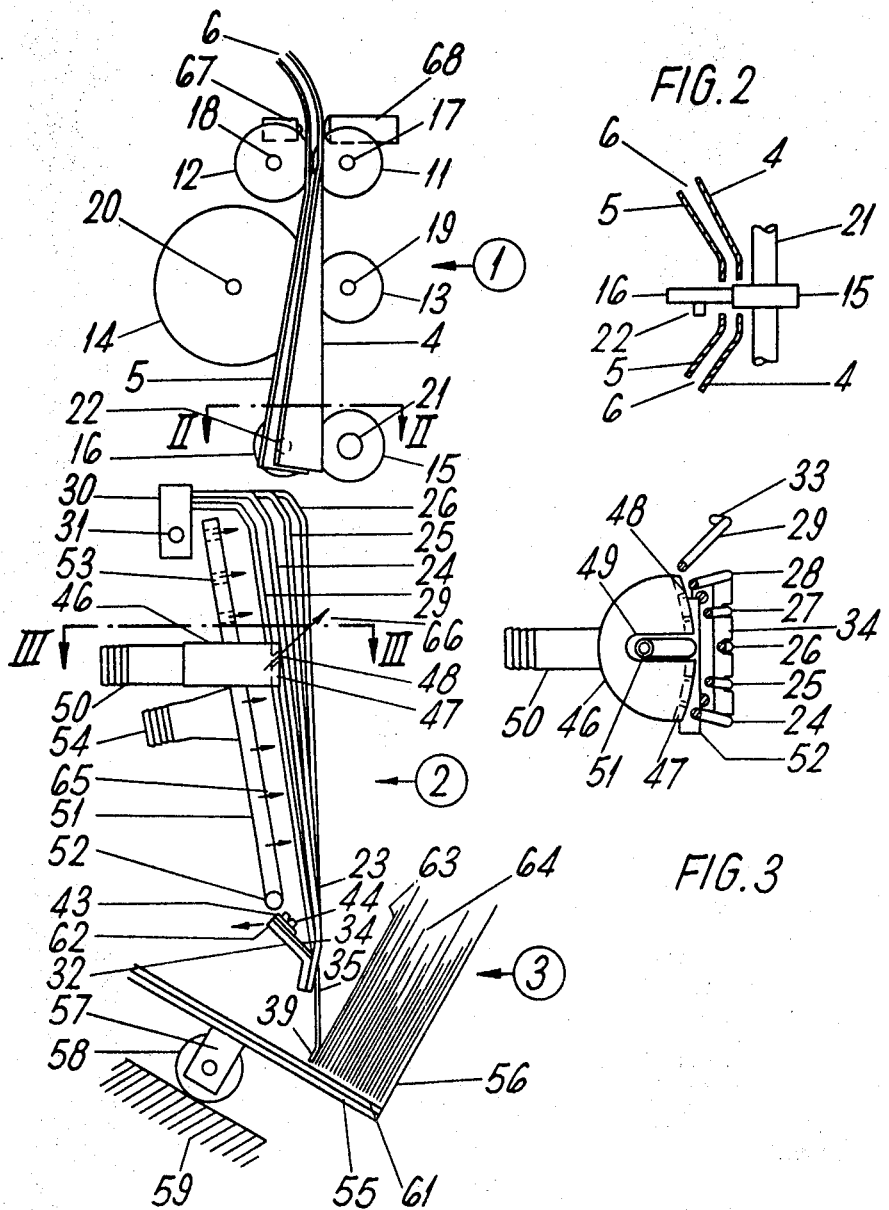

3,606,312
DOCUMENT STACKING DEVICE
Willy Alfons Franciscus Mens, Dasstratt, and Raymond Gilbert Remigius-Dominicus Debackere, Perd, Verbiestlaan, Belgium, assignors to International Standard Electric Corporation, New York, N.Y.
Filed Aug. 14, 1969, Ser. No. 850,047
Claims priority, application Netherlands, Aug. 30, 1968, 6812347
Int. Cl. B65h 29/22, 29/52, 31/06
U.S. Cl. 271—71                                          15 Claims

ABSTRACT OF THE DISCLOSURE

Apparatus for stacking at high speeds documents ranging in weight from the very light to the relatively heavy, comprising document propelling means, guiding and air blowing means, and a stacking receptacle. The invention includes a curved guide frame which provides the document with a certain beneficial stiffness. Pressurized air is blown through the guide frame perpendicular to the passing documents to aid in the transfer thereof from the propelling means to the stacking receptacle, and further, to provide for the prevention of transverse ripple of the documents. Second air blow means, responsive to document length detecting means, are included to prevent the folding or buckling of extra long documents.

BACKGROUND OF THE INVENTION

The present invention relates to a document stacking device comprising a guide frame along which documents fed by propelling means are able to glide into a stacking position with the help of document deflecting means.

Such a document stacking device is already known from U.S. Patent No. 3,124,352. In this known device said document deflecting means are constituted by a cantilever spring which is so mounted that when the leading edge of a document leaves the propelling means it deflects said spring and is thus braked, thereby storing energy in this spring which is liberated when the trailing edge of the document leaves the propelling means. The document is then deflected into the stacking position.

A drawback of this known device is that it is not adapted to handle documents which range in weight from very light to relatively heavy. Indeed, for light documents the above spring must be very light but in this case heavy documents cannot be deflected into the stacking position by such a deflected spring, the energy stored therein being too small. On the other hand, for relatively heavy documents the above spring must be relatively strong in order to be able to deflect such documents into stacking position, but in this case light documents cannot deflect this spring.

SUMMARY OF THE INVENTION

It is therefore an object of the present invention to provide a document stacking device which is adapted to handle all kinds of documents, i.e. having weights ranging from very light to relatively heavy, and to stack them at high speed.

The present document stacking device is particularly characterized in that the document deflecting means are adapted to direct a stream of fluid through at least one opening of the guide frame on a document so as to deflect this document into the stacking position when the trailing edge of this document leaves the propelling means.

The present invention also relates to a document stacking device comprising a guide frame along which documents fed by propelling means are able to glide into a stacking position, the guide frame being pivoted at its one end nearest the propelling means and having a main portion which is substantially mounted in the prolongation of the propelling means and which makes an angle with the plane of the documents stacked in the stacking position, and said guide frame having a free other end nearest the stacking position which is substantially parallel to the plane, said guide frame further including a resilient element which is secured to one end and which has a free other end.

The present invention further relates to a document stacking device comprising a guide frame along which documents fed by propelling means are able to glide into a stacking position and document stopping means to stop the documents in said stacking position.

This document stacking device is characterized in that it further includes means to direct a stream of fluid through at least one opening of the guide frame on the trailing portion of a document in order to prevent the portion from being folded over the remaining portion of the document at the moment the leading edge thereof impacts on the stopping means and after said trailing portion has left said propelling means.

This document stacking device is also characterized in that it includes means to direct a stream of fluid through at least one opening of the guide frame and substantially over the width thereof so as to prevent a document from being transversely rippled when it abuts against the stopping means.

The present invention also relates to a document stacking device comprising a guide frame along which documents fed by propelling means are adapted to bow the documents in such a manner that they have a curve-shaped cross-section in order to increase their rigidity.

In brief, a preferred embodiment of the document stacking device according to the present invention including a grid-shaped guide frame which is mounted between propelling or conveyor means and a stacking position and along which documents fed by these conveyor means are able to glide. This frame is pivoted at its one end nearest the conveyor means and carries a comb-shaped blade spring at its other end. The free end of this spring is perpendicular to an end wall of the stacking position and parallel to the plane of the documents when stacked in this stacking position, while the remaining portion of this spring is located in the prolongation of the main portion of the frame, this main portion making an angle with the above-mentioned plane. Air blowing means are provided and adapted to blow air through the frame and substantially perpendicularly to the longitudinal axis thereof. Documents to be stacked glide on the guide frame when leaving the conveyor means and are braked by the spring and deflected in the stacking position by the effect of the blown air and also due to the fact that the leading edge of the document undergoes a sudden change of direction when entering below the end of the spring.

BRIEF DESCRIPTION OF THE DRAWINGS

The above-mentioned and other objects and features of the invention will become more apparent and the invention itself will be best understood by referring to the following description taken in conjunction with the accompanying drawings in which:

FIG. 1 represents a front view of a document stacking device according to the invention;

FIG. 2 is a cross-section along line II—II of FIG. 1 through the document propelling means shown therein and considered in the direction of the arrows;

FIG. 3 is a cross-section along line III—III of FIG. 1 through the document guiding and air blowing arrangement shown therein and considered in the direction of the arrows;

DESCRIPTION OF THE PREFERRED EMBODIMENT

Figure 4:
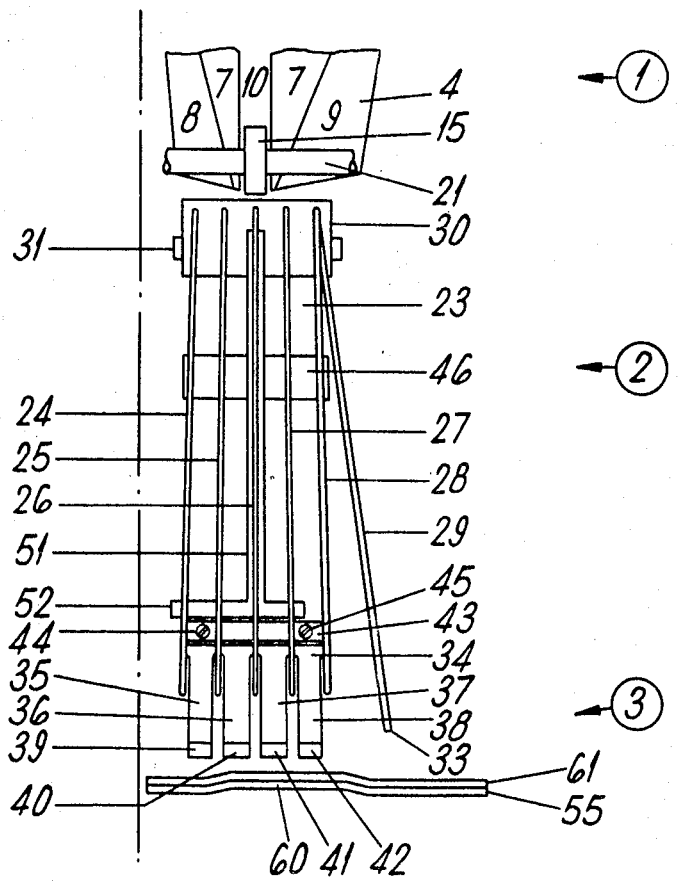
FIG. 4 is a side view from right to left of FIG. 1 considered in the direction of the arrows, the stacking position of the device being however shown in cross-section and the documents in this stacking position and part of the propelling means omitted for clarity.

Principally referring to these figures the document stacking device shown therein includes document propelling or conveyor means generally indicated by reference numeral 1, a document guiding and air blowing arrangement generally indicated by reference numeral 2 and a stacking position generally indicated by reference numeral 3.

The propelling or conveyor means 1 include two guide plates 4 and 5 which are mounted at a certain distance from one another so as to form a guide channel 6 for the documents conveyed. Each of these guide plates 4, 5 has a vertical central portion and two bent edge portions making an angle with the central portion in such a manner that the guide channel 6 substantially has a curve-shaped cross-section. For instance, guide plate 4 has central portion 7 (FIG. 4) and bent edge portions 8, 9. The central portions of the guide plates 4, 5 each have a longitudinal slot, e.g. the central portion 7 of guide plate 4 has longitudinal slot 10. Through these slots project the pairs of rollers 11, 12, 13, 14 and 15, 16 which are mounted on the axles 17, 18; 19, 20 and 21, 22 respectively. The rollers 11, 13 and 16 are idle rollers whereas the rollers 12, 14 and 15 are drive or propelling rollers, the axles 18, 20 and 21 being drive shafts.

The document guiding and air blowing arrangement 2 includes a substantially L-shaped guide frame generally indicated by reference numeral 23 which is mounted substantially in the prolongation of the propelling means 1. This frame 23 is grid-shaped and constituted by six spaced rods 24 to 29 delimiting a surface the portion of which adjacent to the propelling means has a curve-shaped cross-section and is located substantially in the prolongation of the curve-shaped guide channel 6. The radius of curvature of this surface gradually increases towards stacking position 3, the portion nearest to this position being completely plane. At their one ends the rods 24 to 29, which are substantially parallel to the direction of advancement of the documents, are soldered to a prismatic block 30 which is pivoted about a fixed axle 31. At their other ends the rods 24 to 28 are soldered to one branch of a bracket 32 having a substantially L-shaped cross-section, whereas the other end 33 of rod 29 is free and slightly bent in its plane so as to be perpendicular to wall 55 of receptacle 3. A cantilever comb-shaped resilient element 34 having four blades 35, 36, 37, 38, the respective ends 39, 40, 41, 42 of which are slightly bent, is secured to the other branch of the L-shaped bracket 32 by means of a plate 43 and screws 44, 45. The ends 39 to 42 of the blades 35 to 38 are perpendicular to wall 55 whereas the remaining portions thereof are located in the prolongation of the main portion of the guide frame 23.

A hollow chamber 46 has a curved wall 47 having a plurality of channels such as 48 is transversely mounted with respect to frame 23 and in close proximity thereof, wall 47 being substantially parallel to this frame 23. Hollow chamber 46 has a cut-out portion 49 and an inlet conduit 50 which is coupled to a source (not shown) of pressurized air via a pneumatic valve (not shown) which is for instance of the type disclosed in Dutch patent application No. 6811256 (R. Debackere-W. Mens 5–4), filed on Aug. 8, 1968 and entitled "Valve." The pressure of the pressurized air is for instance equal to 0.7 kg./cm.$^2$.

Through this cut-out portion 49 extends the longitudinal branch 51 of a T-shaped hollow chamber 51, 52, the transverse branch 52 of which is located in proximity with the L-shaped bracket 32. The longitudinal branch 51 and the transverse branch 52 are provided with a plurality of openings such as 53. T-shaped chamber 51, 52 further has an inlet conduit 54 which is directly connected to a source of pressurized air the pressure of which is for instance equal to 0.14 kg./cm.$^2$. The T-shaped hollow chamber 51, 52 and its conduit 54 constitute document deflecting means.

Stacking position 3 includes stacking means constituted by two walls 55 and 56 which are perpendicular to one another. To wall 55, which constitutes a document stopping means, is secured a bracket 57 which carries a roller 58 adapted to roll on a guide surface 59. Wall 55 has a portion 60 which slightly projects from the remaining part of the wall in the direction of the resilient element 34 and is covered with a sponge cushion 61.

The edge 62 of the L-shaped bracket 32 controls a servo-mechanism (not shown) in order to maintain the top document 63 of a stack 64 of such documents at a substantially constant distance from the L-shaped bracket 32. This servo-mechanism is for instance of the type disclosed in the above-mentioned U.S. Pat. No. 3,124,352.

A photocell 67 and an associated light source 68 are mounted in front of each other at the one end and other sides of the guide channel 6 and at a predetermined distance from the gap between the rollers 15 and 16. This distance is for instance equal to about 113 millimeters while the distance between these rollers and the end wall 55 measured along the path followed by the documents is equal to about 210 millimeters.

Figure 5:
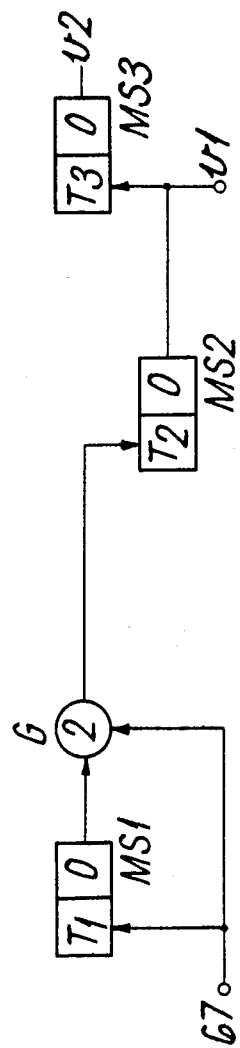
FIG. 5 is a schematic diagram of an electrical control circuit forming part of a document stacking device according to the invention.

Principally referring to FIG. 5, the electrical control circuit shown therein includes the above-mentioned photocell 67, the output of which is connected to the 1-input of a monostable device MS1 and to the first input of a two-input AND-gate G. The 0-output of the monostable device MS1 is connected to the second input of AND-gate G, the output of which is connected to the 1-input of monostable device MS2. The unstable or 0-output of the monostable device MS2 is connected to the 1-input of monostable device MS3 and to the est input of the above-mentioned valve via conductor $v1$. The 0-output of the monostable device MS3 is connected to the reset input of the same valve via conductor $v2$. The monostable devices MS1, MS2 and MS3 are designed such that, after having been brought into their unstable condition for a predetermined time interval equal to T1, T2, T3 respectively, they deliver a trigger pulse at their 0-output at the end of this time interval. These time intervals T1, T2 and T3 are equal to approximately 20.5; 9 and 14 milliseconds respectively. As will become clear later the devices 67, 68, MS1 and G constitute document length detecting means.

The operation of the above-described document stacking device is disclosed in detail hereinafter.

Normally the above-mentioned sources of pressurized air are operated, whereas the above-mentioned valve is in its rest position, so that pressurized air is only supplied to the T-shaped hollow chamber 51, 52, due to which a plurality of jets of air issue from this chamber in the direction of the arrows such as 65.

When a document to be stacked enters the curved guide channel 6 it is propelled therein by means of the pairs of rollers 11, 12; 13, 14 and 15, 16 at a speed of for example 7.54 m./sec. Due to the fact that it is curved this document has a certain rigidity.

During its travel in the guide channel 6 the document interrupts the light beam between the source of light 68 and the photoelectric cell 67. Consequently the latter photocell 67 triggers monostable MS1 to its unstable condition, wherein it remains for a time interval equal to T1, and simultaneously primes the AND-gate G via its first input.

When the leading edge of the document leaves the pair of rollers 15, 16 it is subjected to the pressure exerted thereon by the plurality of jets of air such as 65.

As long as the document is held between the rollers 15, 16 the jets of air which issue from the longitudinal branch 51 of the hollow chamber 51, 52 and which are substantially perpendicular to the longitudinal center portion of the document, exert a pressure on this portion which is insufficient to detach the document from frame 23. This pressure on the contrary has the effect that the longitudinal lateral portions of the document are firmly applied against the frame 23 so that at least the portion of this document nearest to guide channel 6 substantially has the same curvature as the portion of the document still located in this guide channel 6. The document hence maintains its rigidity during its travel along frame 23.

Due to the fact that frame 23 gradually becomes flat in the direction of the stacking position the document gliding thereon is also gradually flattened. Being plane, the leading portion of the document is then able to easily enter between the top document 63 of stack 64 and the ends 39 to 42 of the blades 35 to 38 of resilient element 34. These blades are hereby deflected due to which the document is braked before impact on the sponge cushion 61. Also, due to the ends 39 to 42 of the blades 35 to 38 being bent with respect to the remaining portions thereof, the leading portion of the document undergoes a sudden change of direction when entering between these ends and the top document 63 of the stack 64. Consequently the remaining portion of the document, the trailing edge of which is supposed to have left the rollers 15, 16 at that moment, is then deflected in a clockwise direction (FIG. 1). This deflection is however continued and finished by the jets of air issuing from the longitudinal branch 51 of the T-shaped hollow chamber 51, 52 until the document is completely in contact with the document 63 of stack 64.

Upon impact of the document on the sponge cushion 61, and especially when this document is relatively long, it has a tendency to become transversely rippled. It has been empirically found that such transverse ripples are eliminated by the jets of air issuing from the transverse branch 52 of the hollow chamber 51, 52.

It should be noted that the speration of the document from frame 23 cannot be hindered by electrostatic effects since the contact surface between this grid-shaped frame and the document is very small.

It has been found that when the length of the document exceeds a predetermined value of for example 154.57 millimeters, the trailing portion thereof is transversely buckled at the moment the leading edge thereof impacts on cushion 61, the concave part of the buckled portion facing frame 23. When no measures are taken the trailing portion of a thus buckled document is folded over the remaining part thereof at the moment this trailing portion leaves guide path 6 and this document is then stacked in the folded condition.

Therefore, when the length of a document exceeds the example length of 154.57 millimeters the monostable device MS2 is triggered to its unstable condition for a time interval equal to about T2=9 milliseconds by a trigger pulse appearing at the output of AND-gate G. Indeed, T1 multiplied by the given document velocity is equal to 154,57 millimeters. At the end of this 9 milliseconds time interval, the trigger pulse appearing at the 0-output of monostable device MS2 is applied to the set input of the above pneumatic value via conductor $v1$. This valve then delivers an air impulse about 8.6 milliseconds later, i.e. when the leading edge of the document is at a distance equal to about 288 millimeters from the photocell or about 175 millimeters from the rollers 15, 16. This air impulse has a pressure of about 0.7 kg./cm.$^2$ and is directed on the trailing portion of the document in the direction of arrow 66, thus preventing this trailing portion from being folded over the remaining part of the document.

This impulse has a duration equal to about T3=14 milliseconds. At the end of this time interval T3 the trigger pulse appearing on output lead $v2$ resets the above value to its rest condition.

It should be noted that when the length of the document is smaller than 154.57 millimeters the output of the photocell 67 is deactivated before the time interval T1 has elapsed so that no trigger pulse will appear at the output of AND-gate G.

As mentioned above, the blades 35 to 38 of the resilient element 34 are deflected when a document impacts thereon and is introduced between the ends 39 to 42 of these blades and the top document 63 of stack 64. Afterwards these blades gradually restore to their rest position and thereby pivot frame 23 in clockwise direction (FIG. 1) about axle 31. By the displacement of frame 23 and more particularly of edge 62, the above-mentioned servo-mechanism is operated in order to displace the stacking means from left to right on guide surface 59.

From the above it follows that each document stacked is braked by the resilient element 34 and that this braking action is independent of the relatively heavy frame 23, which is only displaced after the document has been stopped. Due to this a gradual braking action is obtained.

The width of frame 23 is smaller than that of the document having the smallest width capable of being stacked by the device, in order that the one longitudinal edge portion of such a document should not enter between rods 27 and 28 and abut against bracket 32 of this frame, it being supposed that the other longitudinal edge portion of the document has been previously lined up at a predetermined distance from rod 24. This reference line is schematically indicated in FIG. 4 by an interrupted line. But in such a case the longitudinal edge portion of documents having widths much larger than that of frame 23 have the tendency to become longitudinally folded around rod 28. In order to prevent this rod 29, making an angle with rod 28 and increasing the width of the frame nearest to the stacking position 3, has been provided.

When a document arrives on frame 23 in such a manner that its longitudinal axis is not parallel to rods 24 and 28 of this frame, it may happen that the document comes into contact with the cushion 61 only with one of its front corner portions which may thus easily be damaged. In order to increase the surface of contact between such a document and this cushion 61, the raised portion 60 has been provided. This portion 60 faces frame 23 but is offset with respect to the longitudinal axis thereof.

It should be noted that the monostable device MS2 has only been provided due to the fact that it was impossible to mount the photocell 67 a distance equal to 67.86 mm., corresponding to 9 milliseconds, closer to the rollers 15, 16.

What is claimed is:

1. In a document stacking apparatus in which documents delivered by propelling means through a guide channel are able to glide into a stacking position within a receptacle, guide means, cooperating between the propelling means and the receptacle, in the form of a guide frame which comprises a grid, one end of which is pivotably mounted and located proximate the prolongation of said guide channel, said grid having a curved cross-section the radius of curvature of which continuously increases from said one end to form a plane at the free other end, said other end being positioned to form an angle with the plane of the documents at said stacking position, and a resilient comb-shaped extension coupled to said other end of said grid, the individual resilient blades of said comb-shaped extension each being bent to have the one portion which includes the free end thereof parallel to the stacking position and the other portion substantially parallel to said grid, the bent shape of said resilient blades being such as to enable a deflection thereof away from their rest position proximate said stacking position while imparting to a document an abrupt guiding motion into the stacking position, said blades gradually returning via their resiliency to said rest position and thereby imparting a swivel movement to said grid, said swivel movement causing said receptacle to be moved a corresponding amount to enable said stacking position to be maintained at a predetermined position relative to said grid.

2. The apparatus according to claim 1 further including document deflecting means adapted to direct a stream of gaseous fluid through at least one opening of said guide frame onto the documents so as to aid in the deflection of each of said documents into said stacking position when the trailing edge of the document leaves said propelling means.

3. The apparatus according to claim 1 wherein said deflecting means include a source of pressurized gaseous fluid coupled to a perforated hollow chamber which is longitudinally mounted with respect to said frame so that the streams of gaseous fluid issuing from the perforations in said chamber are substantially directed towards the longitudinal axis of said frame and are substantially perpendicular thereon.

4. The apparatus according to claim 3 wherein said document deflecting means include hollow chambers forming a single T-shaped chamber.

5. The apparatus according to claim 1 further including document stopping means to stop said documents in said stacking position and first means to direct a stream of gaseous fluid through at least one opening of said guide frame onto the trailing portion of a document in order to prevent said portion from being folded over the remaining portion of the document at the moment the leading edge thereof impacts on said stopping means and after said trailing portion has left said propelling means.

6. The apparatus according to claim 5 wherein said first means include a source of pressurized gaseous fluid coupled to a hollow chamber the front wall of which has a plurality of channels and which is transversely mounted with respect to said frame so that the streams of gaseous fluid issuing from said channels are directed towards the portion of said guide frame adjacent said propelling means and extend over the whole width of this frame.

7. The apparatus according to claim 6 further including valve means and document length detecting means, wherein said source of pressurized gaseous fluid is coupled to said hollow chamber via said valve means under the control of said document length detecting means, so as to establish a temporary communication between said source and said hollow chamber when said detecting means have detected that the length of a document exceeds a predetermined length.

8. The apparatus according to claim 1 further including document stopping means to stop said documents in said stacking position and means for directing a stream of gaseous fluid through at least one opening of said guide frame and substantially over the width thereof so as to prevent a document from being transversely rippled when it abuts against said stopping means.

9. The apparatus according to claim 8 wherein said means include a hollow chamber which is transversely mounted with respect to the longitudinal axis of said frame near the end of said frame adjacent to said stacking position.

10. The apparatus according to claim 1 wherein said guide channel is shaped to bow the documents in such a manner as to impart thereto a curve-shaped cross-section which increases rigidity, and wherein the guidance frame portion nearest said propelling means has substantially the same radius of curvature as that imparted to the documents when leaving said propelling means.

11. The apparatus according to claim 10 wherein said frame is constituted by a plurality of spaced rods.

12. The apparatus according to claim 11 wherein said frame is constituted by a plurality of first rods and by a second rod, said first rods being substantially parallel to the direction of advancement of the documents, the outer first rods being at a distance from each other which is smaller than the width of the smallest document to be stacked, and said second rod being fixed at its end nearest said propelling means and free at its other end nearest said stacking position and so mounted that the width of said frame constituted by said first and second rods nearest said stacking position is larger than the width of said smallest document.

13. The apparatus according to claim 12 wherein said second rod is mounted at the side of said frame opposite to that with which the documents are normally aligned when leaving said propelling means.

14. The apparatus according to claim 13 wherein the free end of said second rod is substantially parallel to the plane of the documents when stacked in said stacking position.

15. The apparatus according to claim 1 wherein said receptacle at said stacking position includes an end wall against which the documents abut when arriving in said stacking position and which has a raised portion facing said frame but which is offset with respect to the longitudinal axis thereof in such a manner that when a said document so arrives in said stacking position that its longitudinal axis not parallel to that of said frame it will make contact with said raised position over a relatively large area at its front corner portion.

References Cited

UNITED STATES PATENTS

| | | | |
|---|---|---|---|
| 201,483 | 3/1878 | Bassett | 271—86 |
| 2,754,119 | 7/1956 | Morgan et al. | 271—86X |
| 3,131,932 | 5/1964 | Maidment | 271—87 |
| 3,365,193 | 1/1968 | Davis | 271—87X |
| 3,421,755 | 1/1969 | Brozo | 271—87X |

JOSEPH WEGBREIT, Primary Examiner

B. H. STONER, JR., Assistant Examiner

U.S. Cl. X.R.

281—87